United States Patent
Cui

(10) Patent No.: US 11,691,544 B2
(45) Date of Patent: *Jul. 4, 2023

(54) LATERAL PROTECTING MECHANISM AND CHILD RESTRAINT SYSTEM THEREWITH

(71) Applicant: Wonderland Switzerland AG, Steinhausen (CH)

(72) Inventor: Zong-Wang Cui, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,720

(22) Filed: May 15, 2022

(65) Prior Publication Data

US 2022/0274512 A1    Sep. 1, 2022

Related U.S. Application Data

(63) Continuation of application No. 17/155,107, filed on Jan. 22, 2021, now Pat. No. 11,358,500, which is a
(Continued)

(30) Foreign Application Priority Data

Oct. 1, 2018    (CN) .......................... 201811166849.0

(51) Int. Cl.
*A47C 1/00* (2006.01)
*A47C 1/10* (2006.01)
*B60N 2/28* (2006.01)

(52) U.S. Cl.
CPC ................. *B60N 2/2872* (2013.01)

(58) Field of Classification Search
CPC .... B60N 2/2872; B60N 2/2851; B60N 2/286; B60N 2/2866; B60N 2/2806;
(Continued)

(56) References Cited

U.S. PATENT DOCUMENTS 5,496,092 A *  3/1996  Williams  ............... A61F 5/3792
                                                    297/256.13
6,827,400 B2 * 12/2004  Menon  ................. B60N 2/2887
                                                    297/238
(Continued)

FOREIGN PATENT DOCUMENTS

CN    207360133 U    5/2018
WO    2017/042326 A1   3/2017

*Primary Examiner* — Shin H Kim
(74) *Attorney, Agent, or Firm* — Winston Hsu

(57) ABSTRACT

A lateral protecting mechanism adapted for a child carrier is provided and includes a protecting block, a locking component, a driving component and an operating component. The protecting block is pivotally disposed a lateral portion of the child carrier. The locking component is slidably disposed on the lateral portion of the child carrier and configured to slide to abut against the protecting block for restraining a pivoting movement of the protecting block. The driving component is located at a position corresponding to the locking component for driving the locking component to slide to abut against the protecting block for restraining the pivoting movement of the protecting block. The operating component is coupled to the driving component for driving the driving component to pivot to drive the locking component to abut against the protecting block when the operating component is operated. Besides, a related child restraint system is provided.

22 Claims, 11 Drawing Sheets

Related U.S. Application Data continuation of application No. 16/589,154, filed on Oct. 1, 2019, now Pat. No. 10,933,779.

(58) Field of Classification Search
CPC .. B60N 2/2821; B60N 2/2884; B60N 2/2863; B60N 2002/2896; A47D 13/02
See application file for complete search history.

(56) References Cited

U.S. PATENT DOCUMENTS

| | | | | |
|---|---|---|---|---|
| 7,261,376 | B2 * | 8/2007 | Kespohl | B60N 2/2875 297/256.13 |
| 7,275,792 | B2 * | 10/2007 | Pos | B60N 2/2872 297/250.1 |
| 7,344,192 | B2 * | 3/2008 | Kespohl | B60N 2/2878 297/256.13 |
| 7,380,877 | B2 * | 6/2008 | Konig | B60N 2/2806 297/483 |
| 7,810,883 | B2 * | 10/2010 | Berger | B60N 2/2851 297/284.3 |
| 8,276,988 | B2 * | 10/2012 | Hartenstine | B60N 2/2872 297/484 |
| 10,807,506 | B2 * | 10/2020 | Denbo | B60N 2/2851 |
| 10,933,779 | B2 * | 3/2021 | Cui | B60N 2/4235 |
| 11,358,500 | B2 * | 6/2022 | Cui | B60N 2/4235 |
| 2002/0036419 | A1 | 3/2002 | Balensiefer | |
| 2004/0189068 | A1 | 9/2004 | Meeker | |
| 2007/0228788 | A1 | 10/2007 | Meeker | |
| 2007/0228792 | A1 | 10/2007 | Chen | |
| 2007/0246982 | A1 | 10/2007 | Nett | |
| 2009/0167065 | A1 | 7/2009 | Kespohl | |
| 2009/0322131 | A1 | 12/2009 | Hartenstine | |
| 2012/0326476 | A1 | 12/2012 | Runk | |
| 2015/0336482 | A1 | 11/2015 | Pos | |
| 2016/0114705 | A1 | 4/2016 | Morgenstern | |
| 2020/0101876 | A1 * | 4/2020 | Cui | B60N 2/2812 |
| 2021/0138937 | A1 * | 5/2021 | Cui | B60N 2/4235 |
| 2022/0274512 | A1 * | 9/2022 | Cui | B60N 2/4235 |

* cited by examiner

LATERAL PROTECTING MECHANISM AND CHILD RESTRAINT SYSTEM THEREWITH

CROSS REFERENCE TO RELATED APPLICATIONS

This application is a continuation application of U.S. application Ser. No. 17/155,107, filed on Jan. 22, 2021, which is a continuation application of U.S. application Ser. No. 16/589,154, filed on Oct. 1, 2019. The contents of these applications are incorporated herein by reference.

BACKGROUND OF THE INVENTION

1. Field of the Invention

The present invention relates to a child product, and more particularly, to a lateral protecting mechanism and a child restraint system therewith.

2. Description of the Prior Art

A child safety seat, a kind of a child restraint, is an apparatus installed on a seat of a vehicle and provided with a restraint device, such as a harness device, for securing a child sitting therein when traveling. When an emergency brake or a collision of the vehicle occurs, the child restraint can reduce impact forces acting on the child and restrain the child's body movement by the restraint device for preventing injury or death of the child for ensuring sitting safety of the child.

Currently, in order to reduce lateral impact forces, child restraints are provided with lateral protecting devices at lateral sides. However, a conventional lateral protecting device is open and usually fixedly disposed on a lateral portion of a child restraint. In other words, a lateral protecting device is not foldable. However, such configuration not only occupies more space but also interferes with other passengers sitting nearby.

Furthermore, there is another conventional lateral protecting device which is foldable for saving occupied space. However, sometimes, a user or a caregiver may forget to unfold a foldable lateral protecting device before travelling, so that the foldable lateral protecting device cannot work properly when an emergency brake or a collision of a vehicle occurs. Besides, two foldable lateral protecting devices at two lateral sides are configured to be maintained in unfolded states together, and a user or a caregiver cannot selectively fold one of the two foldable lateral protecting devices to a folded state according to practical demands after the two foldable lateral protecting devices are operated to be in the unfolded states.

Therefore, there is a need to provide an improved lateral protecting mechanism adapted for a child carrier, which has an automatic unfolding operation and can be folded or unfolded according to practical demands, and a child restraint system therewith for solving the aforementioned problem.

SUMMARY OF THE INVENTION

It is an objective of the present invention to provide a lateral protecting mechanism adapted for a child carrier, which has an automatic unfolding operation and can be folded or unfolded according to practical demands, and a child restraint system therewith.

In order to achieve the aforementioned objective, the present invention discloses a lateral protecting mechanism adapted for a child carrier. The lateral protecting mechanism includes a protecting block, a locking component, a driving component and an operating component. The protecting block is pivotally disposed a lateral portion of the child carrier. The locking component is slidably disposed on the lateral portion of the child carrier and configured to slide to abut against the protecting block for restraining a pivoting movement of the protecting block. The driving component is located at a position corresponding to the locking component for driving the locking component to slide to abut against the protecting block for restraining the pivoting movement of the protecting block. The operating component is coupled to the driving component for driving the driving component to pivot to drive the locking component to abut against the protecting block when the operating component is operated.

According to an embodiment of the present invention, the operating component is disposed on a seat portion of the child carrier.

According to an embodiment of the present invention, the operating component is combined with a strap disposed on the seat portion of the child carrier, and the strap operates the operating component to drive the driving component to drive the locking component to slide to abut against the protecting block for restraining the pivoting movement of the protecting block when the strap is fastened.

According to an embodiment of the present invention, the lateral protecting mechanism further includes a linking component connected to the driving component and the operating component, and the operating component drives the driving component to drive the locking component to slide for restraining the pivoting movement of the protecting block by the linking component when the operating component is operated.

According to an embodiment of the present invention, the lateral protecting mechanism further includes at least one unfolding resilient component disposed between the protecting block and the lateral portion of the child carrier for driving the protecting block to pivot.

According to an embodiment of the present invention, a positioning recess is on an outer periphery of the driving component and extends along a rotating direction of the driving component for separably engaging with the locking component.

According to an embodiment of the present invention, the locking component does not abut against the protecting block when the locking component engages with the positioning recess, and the locking component is driven to slide to abut against the protecting block when the driving component pivots to disengage the locking component from the positioning recess.

According to an embodiment of the present invention, the locking component includes an abutting protrusion located at a position corresponding to the positioning recess for separably engaging with the positioning recess.

According to an embodiment of the present invention, the operating component is connected to the outer periphery of the driving component to drive the driving component to pivot.

According to an embodiment of the present invention, the locking component includes a positioning protrusion protruding along a sliding direction of the locking component, and the protecting block includes a positioning rib located at a position corresponding to the positioning protrusion.

According to an embodiment of the present invention, the protecting block is restrained from pivoting when the positioning protrusion engages with the positioning rib.

According to an embodiment of the present invention, the lateral protecting mechanism further includes at least one recovering resilient component disposed between the driving component and the lateral portion of the child carrier for driving the driving component to recover.

According to an embodiment of the present invention, the lateral protecting mechanism further includes a fixing base fixedly disposed on the lateral portion of the child carrier. The protecting block includes a pivoting shaft. The protecting block is pivotally disposed on the fixing base by the pivoting shaft. The locking component is configured to protrude out of the fixing base to abut against the protecting block, and the driving component is disposed inside the fixing base.

According to an embodiment of the present invention, the fixing base includes a fixing portion and a mounting portion protruding from the fixing portion. The fixing base is fixedly disposed on the lateral portion of the child carrier by the fixing portion. The locking component is slidably disposed inside the mounting portion. The driving component is pivotally disposed inside the mounting portion and abuts against the locking component, and the protecting block is pivotally disposed on the mounting portion and located outside the mounting portion.

According to an embodiment of the present invention, an accommodating chamber is in the mounting portion. A through hole is on a wall of the mounting portion and communicated with the accommodating chamber. The locking component and the driving component are disposed in the accommodating chamber, and the locking component slides to pass through the through hole to abut against protecting block.

According to an embodiment of the present invention, a sliding direction of the locking component intersects with a pivoting axis of the protecting block.

In order to achieve the aforementioned objective, the present invention further discloses a child restraint system including a child carrier and at least one lateral protecting mechanism. The child carrier includes a seat portion and at least one lateral portion. The at least one lateral protecting mechanism includes a protecting block, a locking component, a driving component and an operating component. The protecting block is pivotally disposed on the at least one lateral portion of the child carrier. The locking component is slidably disposed on the at least one lateral portion of the child carrier and configured to slide to abut against the protecting block for restraining a pivoting movement of the protecting block. The driving component is located at a position corresponding to the locking component for driving the locking component to slide to abut against the protecting block for restraining the pivoting movement of the protecting block. The operating component is coupled to the driving component for driving the driving component to pivot to drive the locking component to abut against the protecting block when the operating component is operated.

According to an embodiment of the present invention, the operating component is connected to a strap disposed on the seat portion of the child carrier, and the strap operates the operating component to drive the driving component to drive the locking component to slide to abut against the protecting block for restraining the pivoting movement of the protecting block when the strap is fastened.

According to an embodiment of the present invention, the at least one lateral protecting mechanism further includes a fixing base fixedly disposed on the at least one lateral portion of the child carrier. The protecting block includes a pivoting shaft. The protecting block is pivotally disposed on the fixing base by the pivoting shaft. The locking component is configured to protrude out of the fixing base to abut against the protecting block, and the driving component is disposed inside the fixing base.

According to an embodiment of the present invention, the fixing base includes a fixing portion and a mounting portion protruding from the fixing portion. The fixing base is fixedly disposed on the at least one lateral portion of the child carrier by the fixing portion. The driving component is pivotally disposed inside the mounting portion. A positioning recess is on an outer periphery of the driving component and extends along a rotating direction of the driving component. The locking component includes an abutting protrusion located at a position corresponding to the positioning recess for separably engaging with the positioning recess. The locking component does not abut against the protecting block when the locking component engages with the positioning recess, and the locking component is driven to slide to abut against the protecting block when the driving component pivots to disengage the locking component from the positioning recess.

According to an embodiment of the present invention, the locking component includes a positioning protrusion protruding along a sliding direction of the locking component. The protecting block includes a positioning rib located at a position corresponding to the positioning protrusion, and the protecting block is restrained from pivoting when the positioning protrusion engages with the positioning rib.

According to an embodiment of the present invention, a sliding direction of the locking component intersects with a pivoting axis of the protecting block.

In summary, in the present invention, as long as the protecting block is not forced to fold by a folding force or not restrained from leaving from the folded position by the locking component, the protecting block can be driven to pivotally switch to the unfolded position automatically by the unfolding resilient component, so as to reduce a lateral impact force when an emergency brake or an accident of a vehicle occurs. It not only simplifies operation but also prevents a user or a caregiver from forgetting to unfold the protecting block to ensure the lateral protecting mechanism to work properly. Furthermore, when the operating component is operated, the operating component drives the driving component to drive the locking component to slide to the locking position for restraining the protecting block at the folded position from leaving from the folded position. Therefore, it provides a convenient way to save occupied space by folding the protecting block to the folded position and then operating the operating component to restrain the protecting block from leaving from the folded position according to practical demands. Besides, when the locking component slides from the releasing position to the locking position, the locking component does not interfere with the protecting block at the unfolded position, and therefore, the protecting block can be maintained at the unfolded position, which brings convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
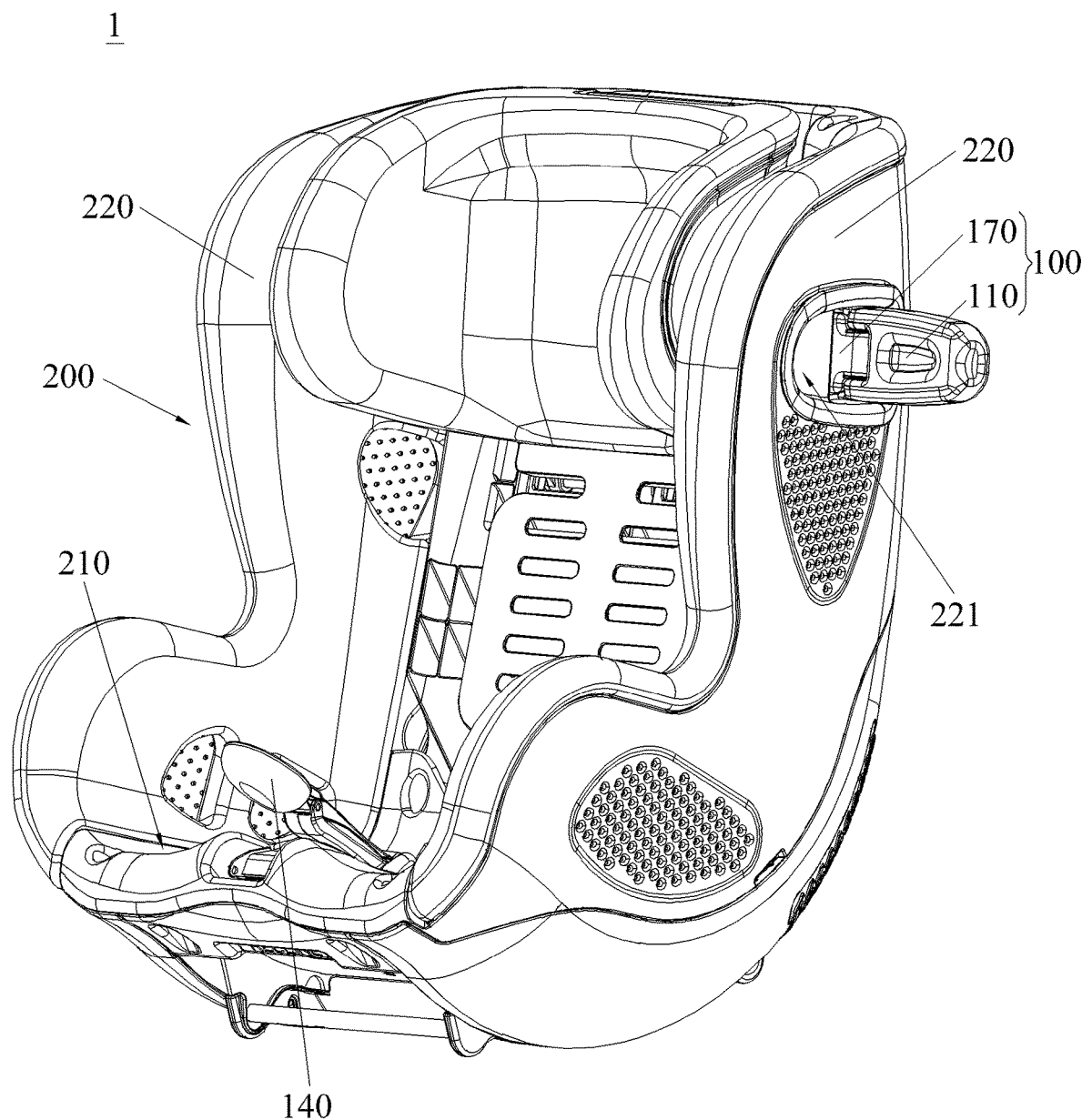
FIG. 1 is a schematic diagram of a child restraint system according to an embodiment of the present invention.
Figure 2:
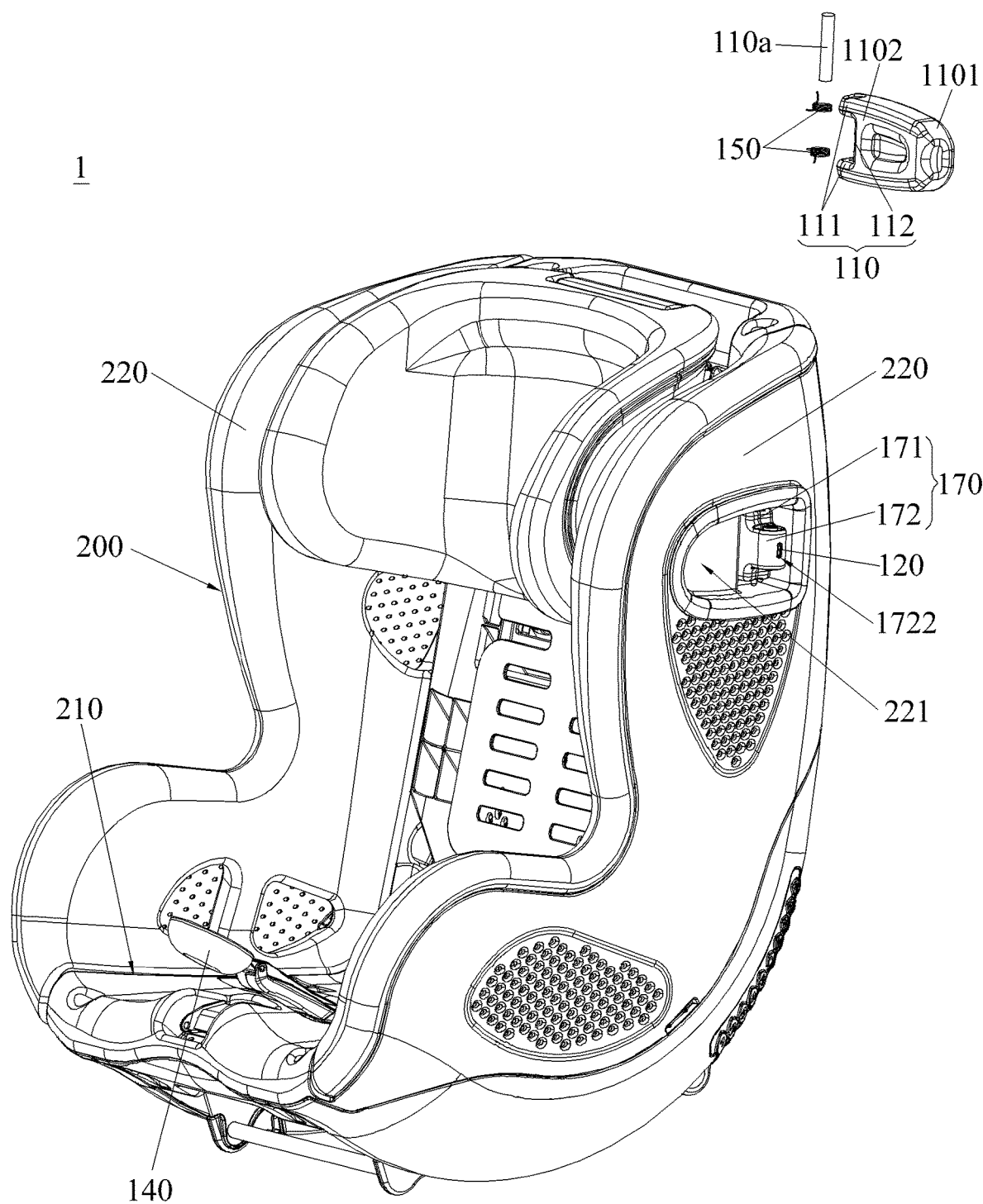
FIG. 2 is a diagram of the child restraint system as a protecting block is detached from a child carrier according to the embodiment of the present invention.
Figure 10:
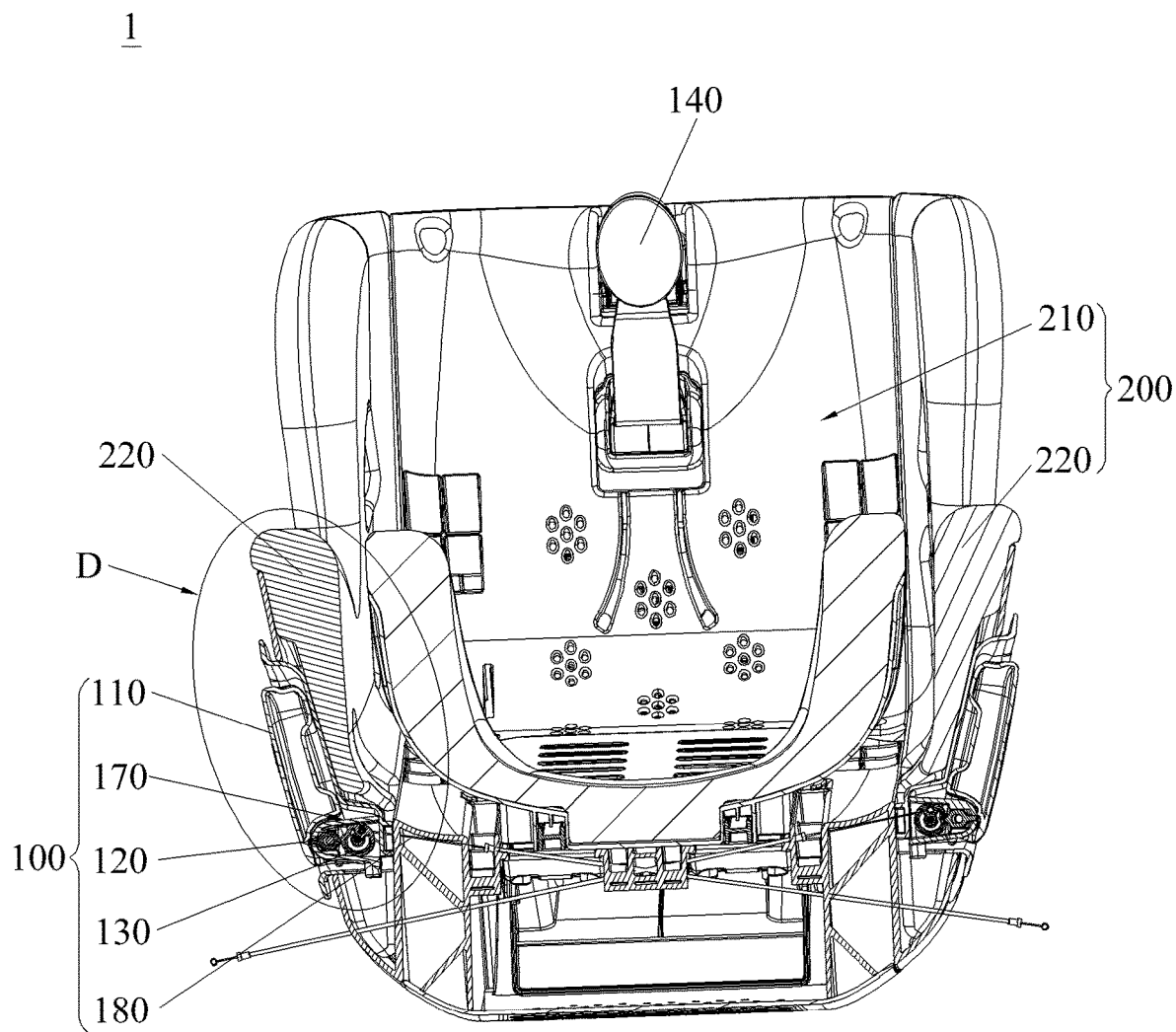
FIG. 10 is a sectional diagram of the child restraint system as the lateral protecting mechanism is in a locking state according to the embodiment of the present invention.
Figure 11:
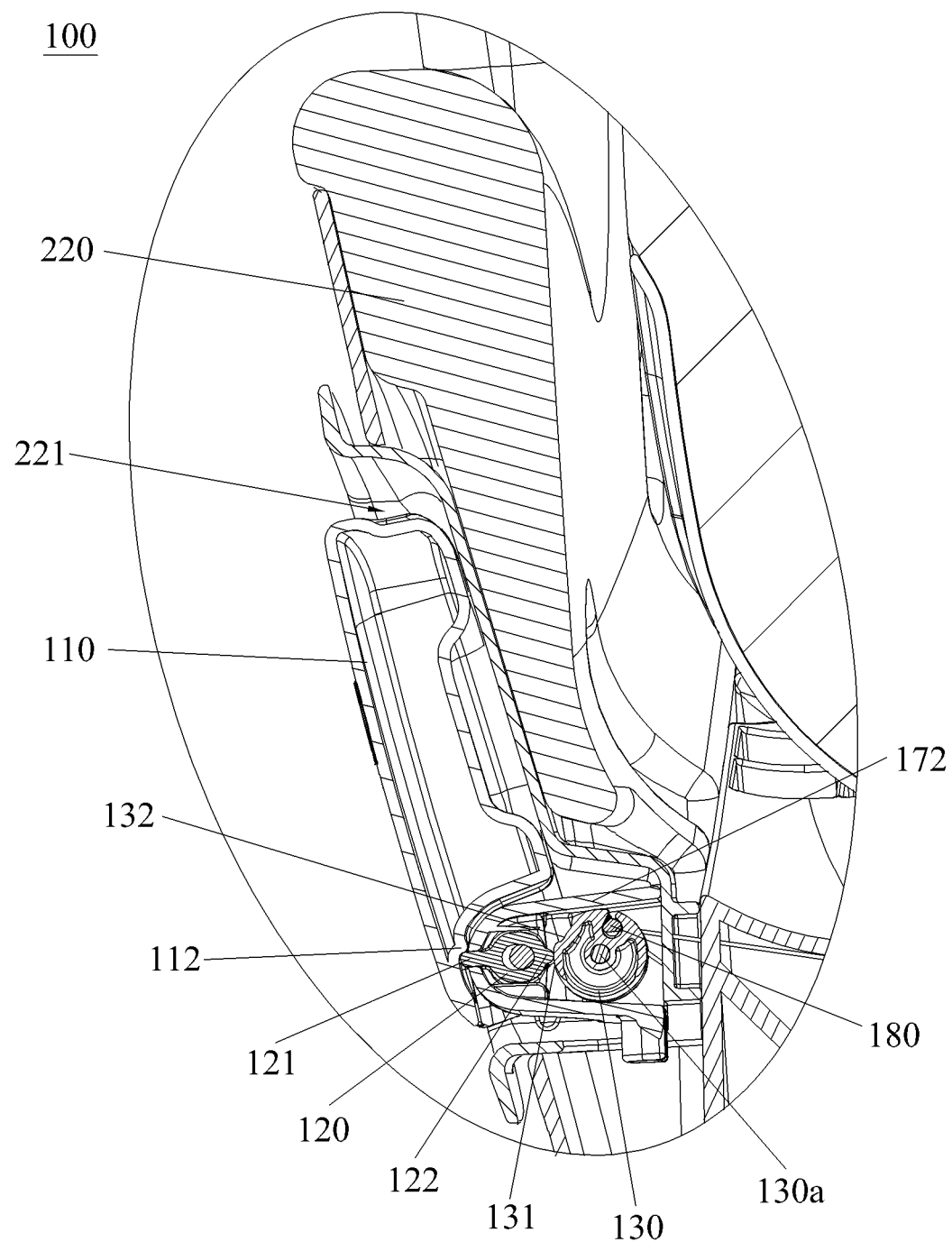
FIG. 11 is an enlarged diagram of a D portion of the child restraint system shown in FIG. 10 according to the embodiment of the present invention.

Please refer to FIG. 1, FIG. 2, FIG. 10 and FIG. 11. FIG. 1 is a schematic diagram of a child restraint system 1 according to an embodiment of the present invention. FIG. 2 is a diagram of the child restraint system 1 as a protecting block 110 is detached from a child carrier 200 according to the embodiment of the present invention. FIG. 10 is a sectional diagram of the child restraint system 1 as a lateral protecting mechanism 100 is in a locking state according to the embodiment. FIG. 11 is an enlarged diagram of a D portion of the child restraint system 1 shown in FIG. 10 according to the embodiment of the present invention. As shown in FIG. 1, FIG. 2, FIG. 10 and FIG. 11, the child restraint system 1 includes two lateral protecting mechanisms 100 and a child carrier 200. In this embodiment, the child carrier 200 can be a child car seat. However, the present invention is not limited thereto. For example, in another embodiment, the child carrier also can be a bassinet or a carriage basket. The child carrier 200 includes a seat portion 210, two lateral portions 220 and a harness system, which is not shown in the figures. The seat portion 210 is for allowing a child to sit therein. The lateral portions 220 are disposed at two lateral sides of the seat portion 210. The harness system is for restraining the child sitting in the seat portion 210. The two lateral protecting mechanisms 100 are disposed on the two lateral portions 220 and can be maintained in unfolded states as shown in FIG. 1, for reducing lateral impact forces acting on the child sitting in the seat portion 210 as long as the two lateral protecting mechanisms 100 are not forced to fold to a folded state by folding forces or not in locking states as shown in FIG. 10 and FIG. 11. Furthermore, at least one of the two lateral protecting mechanisms 100 can be switched to the locking states, i.e., the protecting block 110 of the lateral protecting mechanism 100 can be pivoted relative to the lateral portion 220 to a folded position as shown in FIG. 10 and FIG. 11, and restrained from leaving from the folded position, for saving occupied space.

Specifically, as shown in FIG. 1 and FIG. 2, an accommodating slot 221 is formed on each lateral portion 220. Each lateral protecting mechanism 100 is pivotally disposed on the corresponding lateral portion 220 and can be pivotally accommodated inside the corresponding accommodating slot 221. However, structure of the child carrier 200 is not limited to those illustrated in the figures. It depends on practical demands. For simplicity, detailed description of the seat portion 210, the lateral portion 220 and the harness system is omitted herein. Furthermore, the two lateral protecting mechanisms 100 at two sides can have the similar structure, and detailed description of the lateral protecting mechanism 100 at one side is provided as follows.

Figure 3:
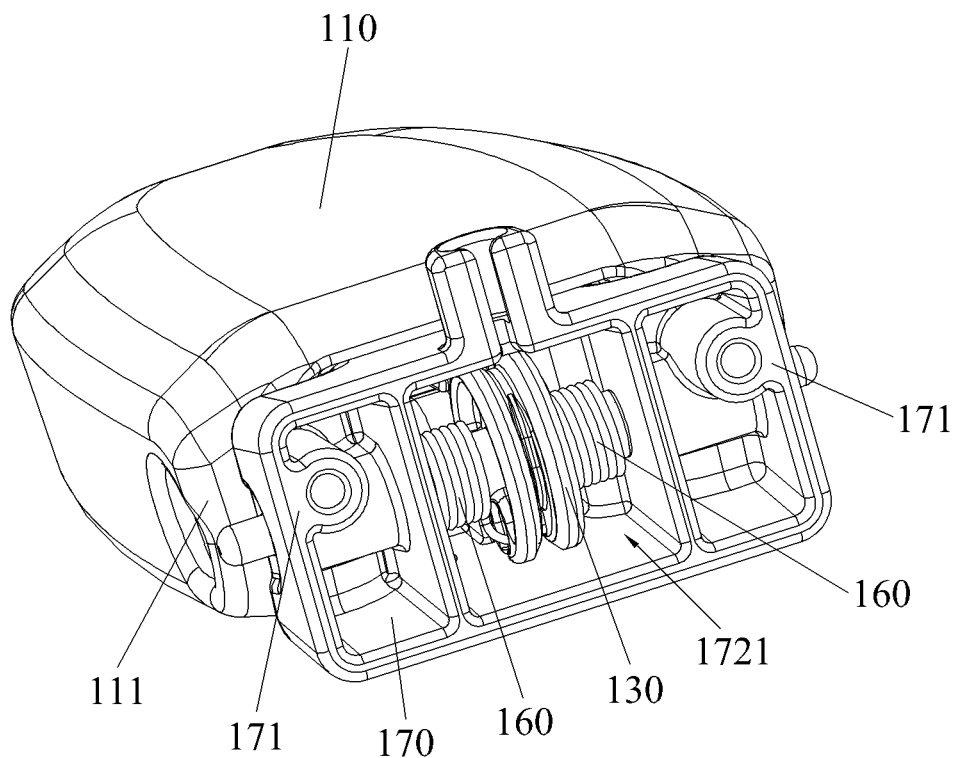
FIG. 3 is a diagram of a lateral protecting mechanism according to the embodiment of the present invention.
Figure 4:
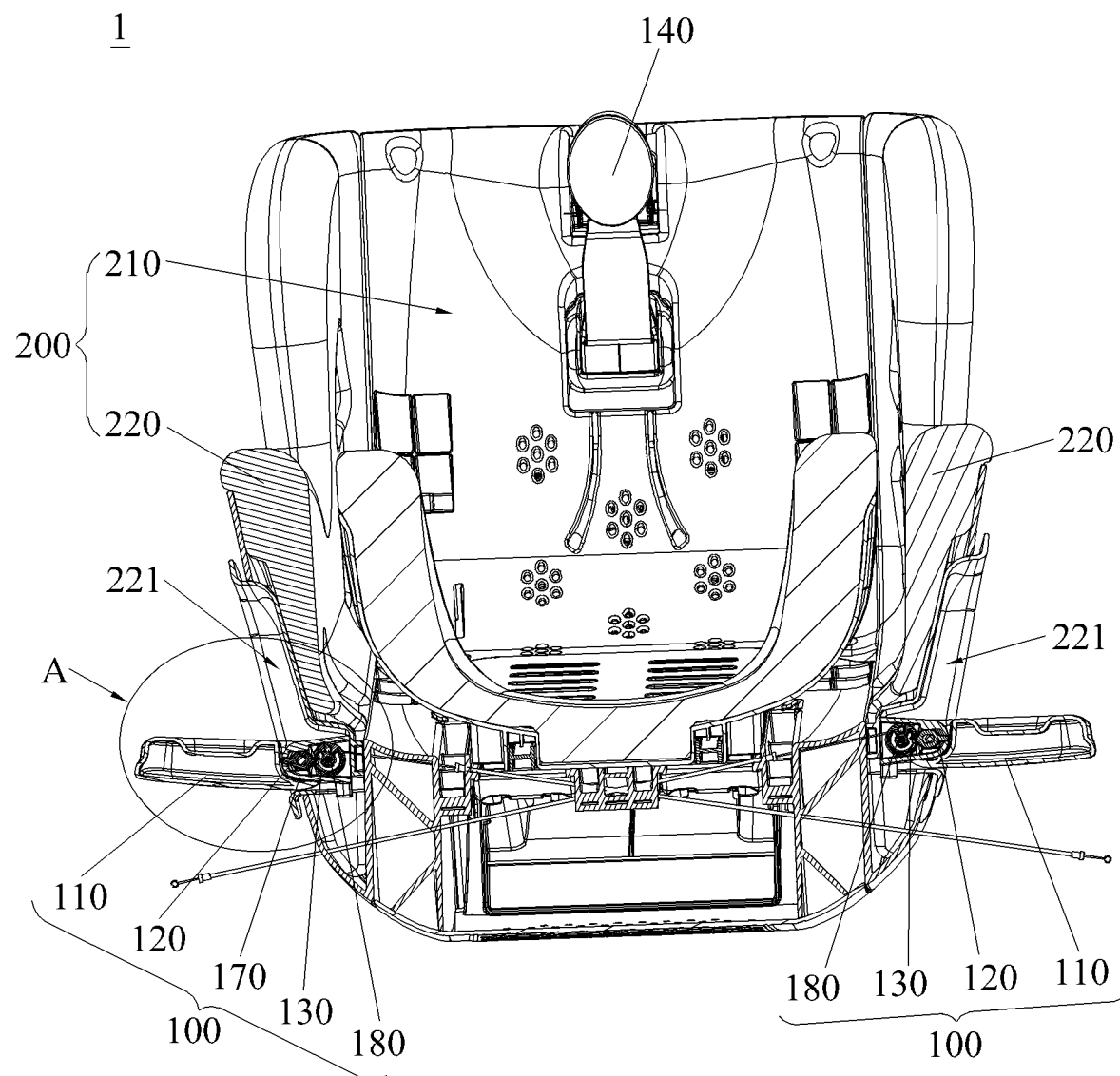
FIG. 4 is a sectional diagram of the child restraint system as the lateral protecting mechanism is in an unfolded state according to the embodiment of the present invention.
Figure 5:
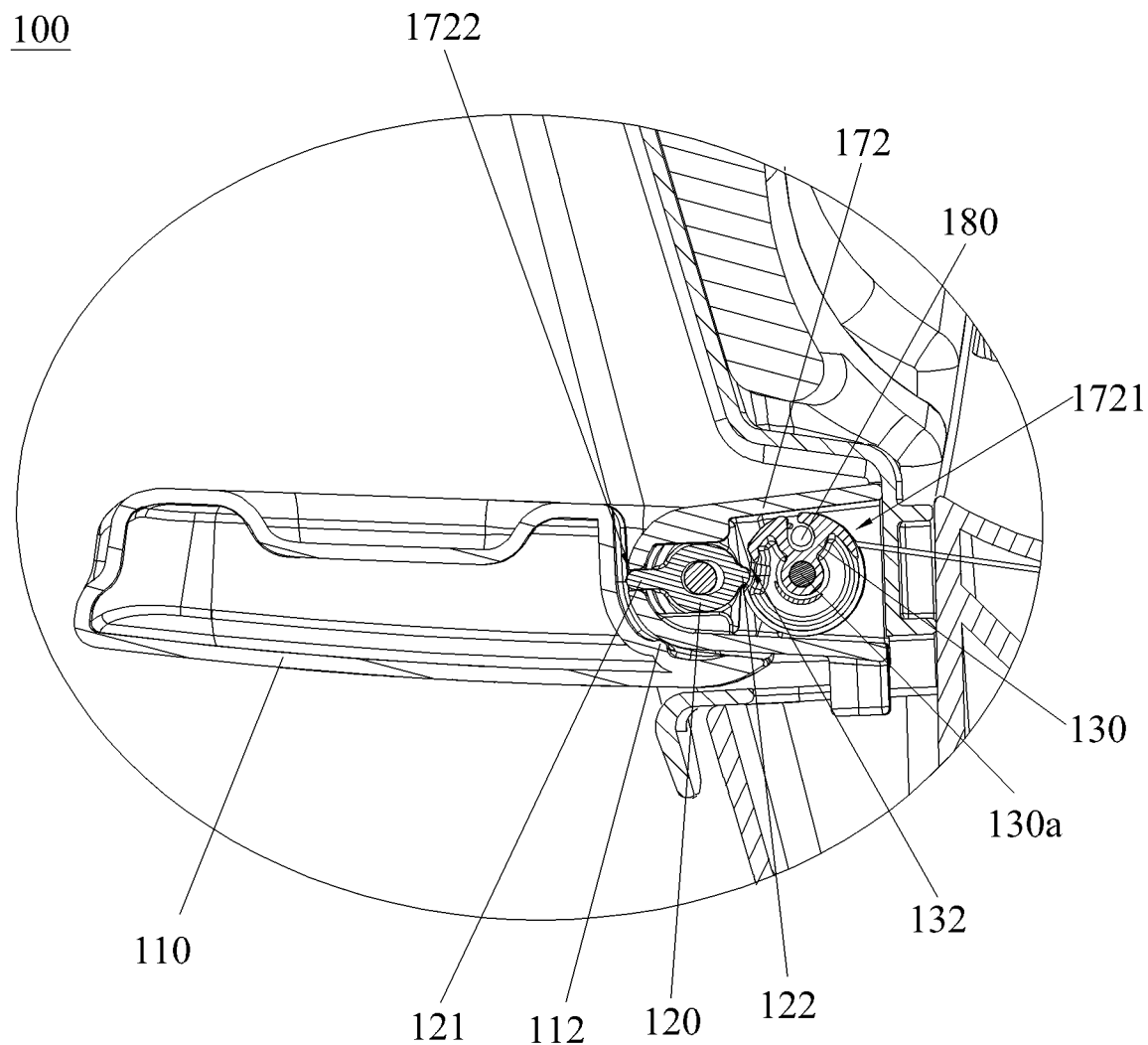
FIG. 5 is an enlarged diagram of an A portion of the child restraint system shown in FIG. 4 according to the embodiment of the present invention.

Please refer to FIG. 1 to FIG. 5 and FIG. 10 and FIG. 11. FIG. 3 is a diagram of the lateral protecting mechanism 100 according to the embodiment of the present invention. FIG. 4 is a sectional diagram of the child restraint system 1 as the lateral protecting mechanism 100 is in the unfolded state according to the embodiment of the present invention. FIG. 5 is an enlarged diagram of an A portion of the child restraint system 1 shown in FIG. 4 according to the embodiment of the present invention. As shown in FIG. 1 to FIG. 5 and FIG. 10 to FIG. 11, the lateral protecting mechanism 100 includes the protecting block 110, a locking component 120, a driving component 130 and an operating component 140. The protecting block 110 is pivotally disposed on the lateral portion 220 and pivotally switchable between an unfolded position, which is away from the lateral portion 220, and the folded position, which is adjacent to the lateral portion 220. The protecting block 110 can be maintained at the unfolded position when the protecting block 110 is not forced by a folding force or not restrained from leaving from the folded position, and the protecting block 110 pivotally switches from the unfolded position to the folded position only when the protecting block 110 is forced by the folding force. The locking component 120 is slidably disposed on the lateral portion 220 and slidably switchable between a locking position and a releasing position. The protecting block 110 is allowed to pivotally switch between the unfolded position and the folded position when the locking component 120 is located at the releasing position.

The locking component 120 is allowed to slide between the releasing position and the locking position when the protecting block 110 is located at the unfolded position or the folded position. When the protecting block 110 is located at the unfolded position, the locking component 120 can slide from the releasing position to the locking position without interfering with the protecting block 110, so that the protecting block 110 can be maintained at the unfolded position. When the protecting block 110 is located at the folded position, the locking component 120 also can slide from the releasing position to the locking position without any interference with the protecting block 110, so that the protecting block 110 can be maintained at the folded position, and the locking component 120 at the locking position can restrain the protecting block 110 at the folded position from leaving from the folded position. The driving component 130 is movably disposed on the lateral portion 220 and located at a position corresponding to the locking component 120 and for driving the locking component 120 to slidably switch between the locking position and the releasing position. The operating component 140 is movably disposed on the child carrier 200 and coupled to the driving component 130 for driving the driving component 130 to drive the locking component 120 to slide. The operating component 140 is configured to drive the driving component 130 to drive the locking component 120 to slide to the locking position when the operating component 140 is operated. In this embodiment, the two lateral protecting mechanisms 100 can share the same operating component 140, i.e., there can be the only one operating component 140 connected to the two driving components 130 of the two lateral protecting mechanisms 100 at the two sides. However, it is not limited to this embodiment. For example, in another embodiment, there can be two operating components for respectively connecting two driving components, so that the two driving components can be driven by the two operating components independently.

Figure 6:
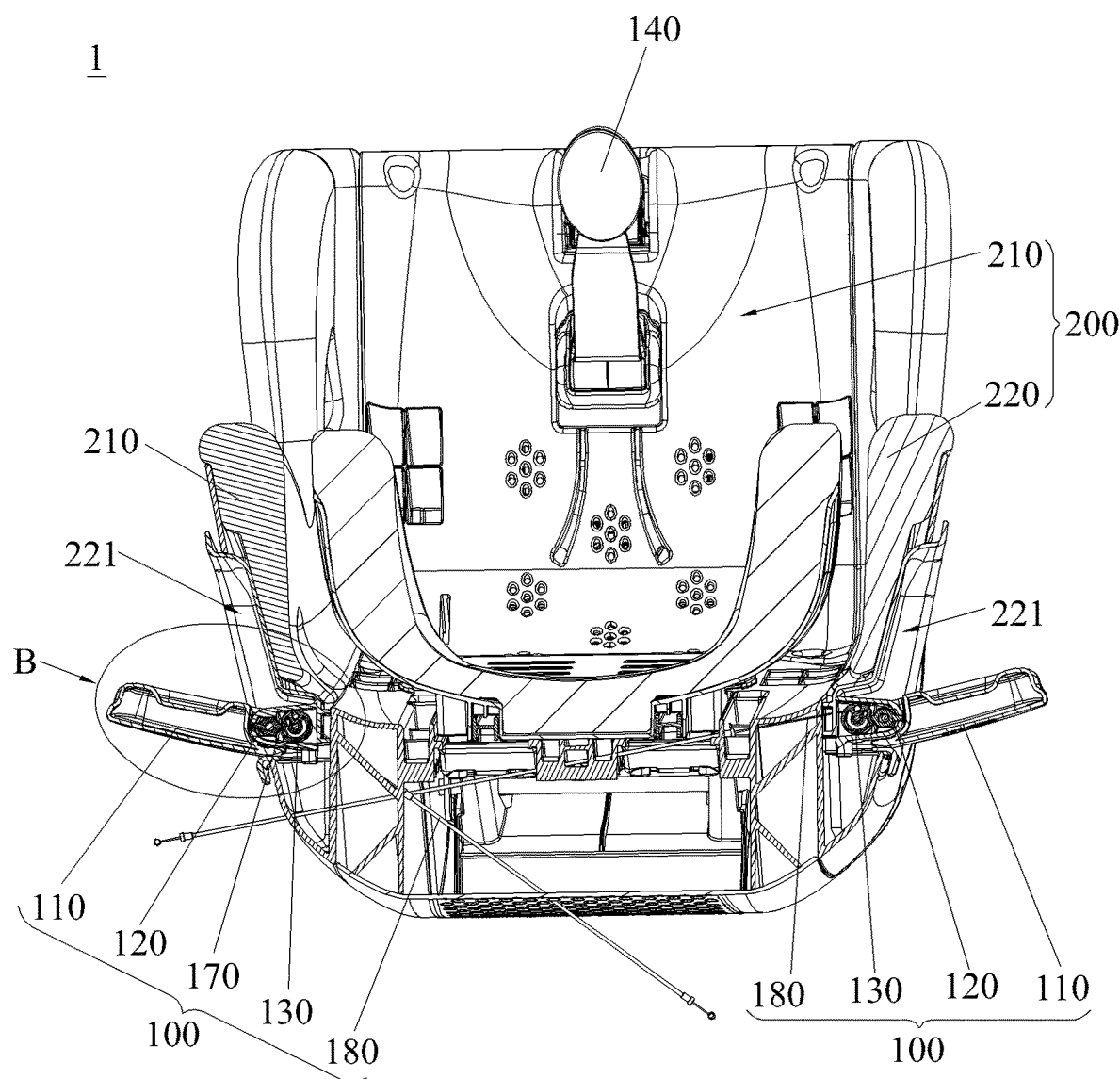
FIG. 6 is a sectional diagram of the child restraint system as the lateral protecting mechanism is in a state between the unfolded state and a folded state according to the embodiment of the present invention.
Figure 7:
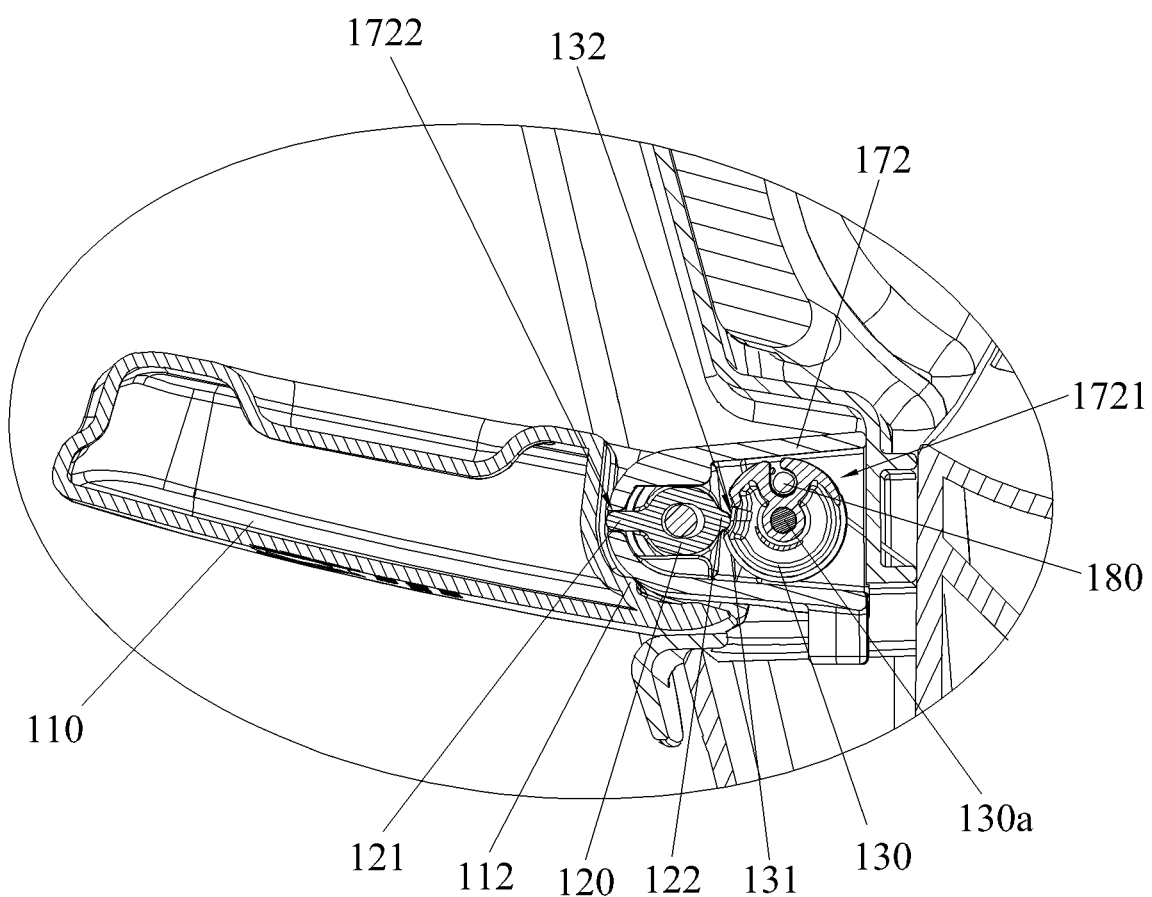
FIG. 7 is an enlarged diagram of a B portion of the child restraint system shown in FIG. 6 according to the embodiment of the present invention.
Figure 8:
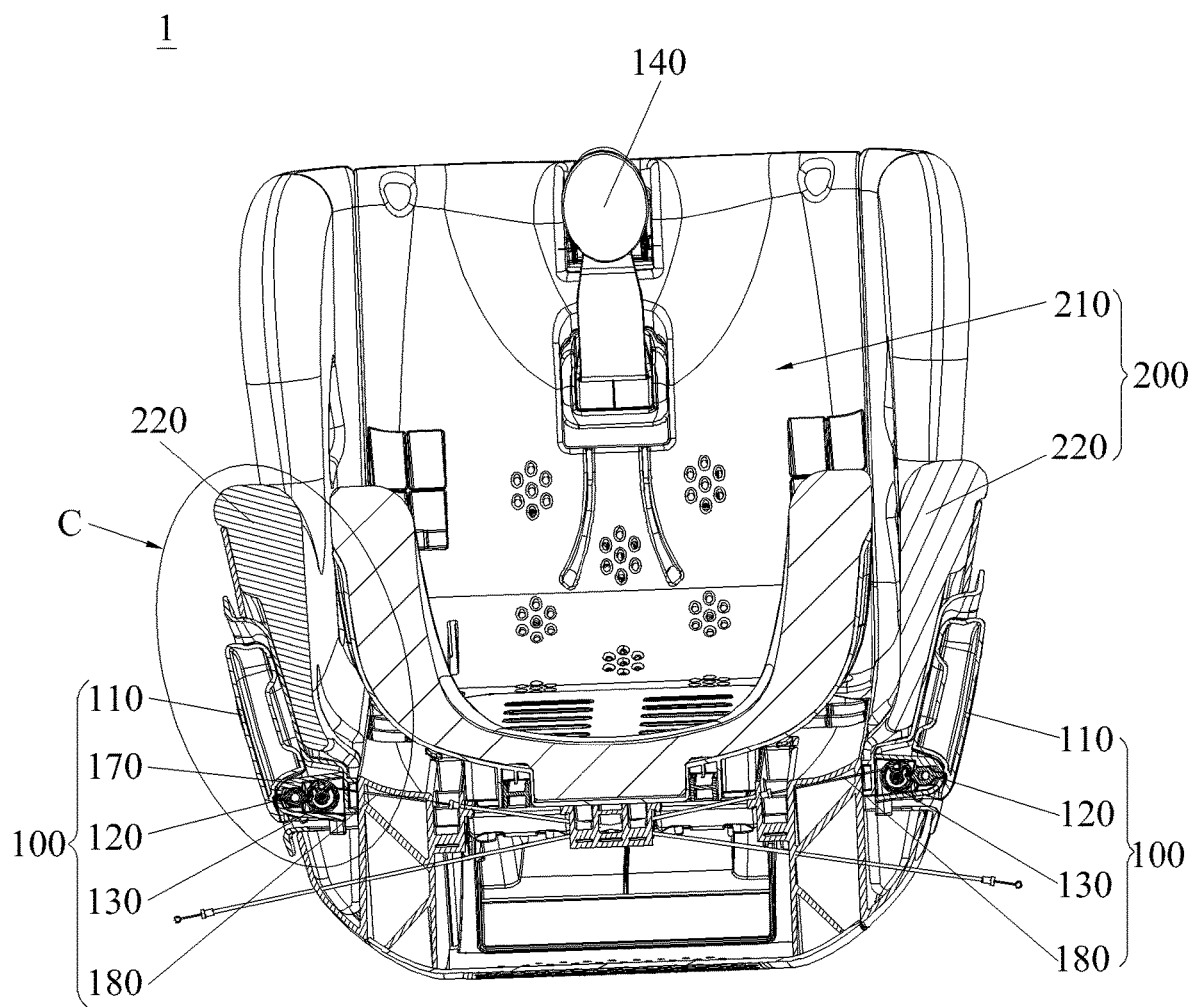
FIG. 8 is a sectional diagram of the child restraint system as the lateral protecting mechanism is at the folded state according to the embodiment of the present invention.
Figure 9:
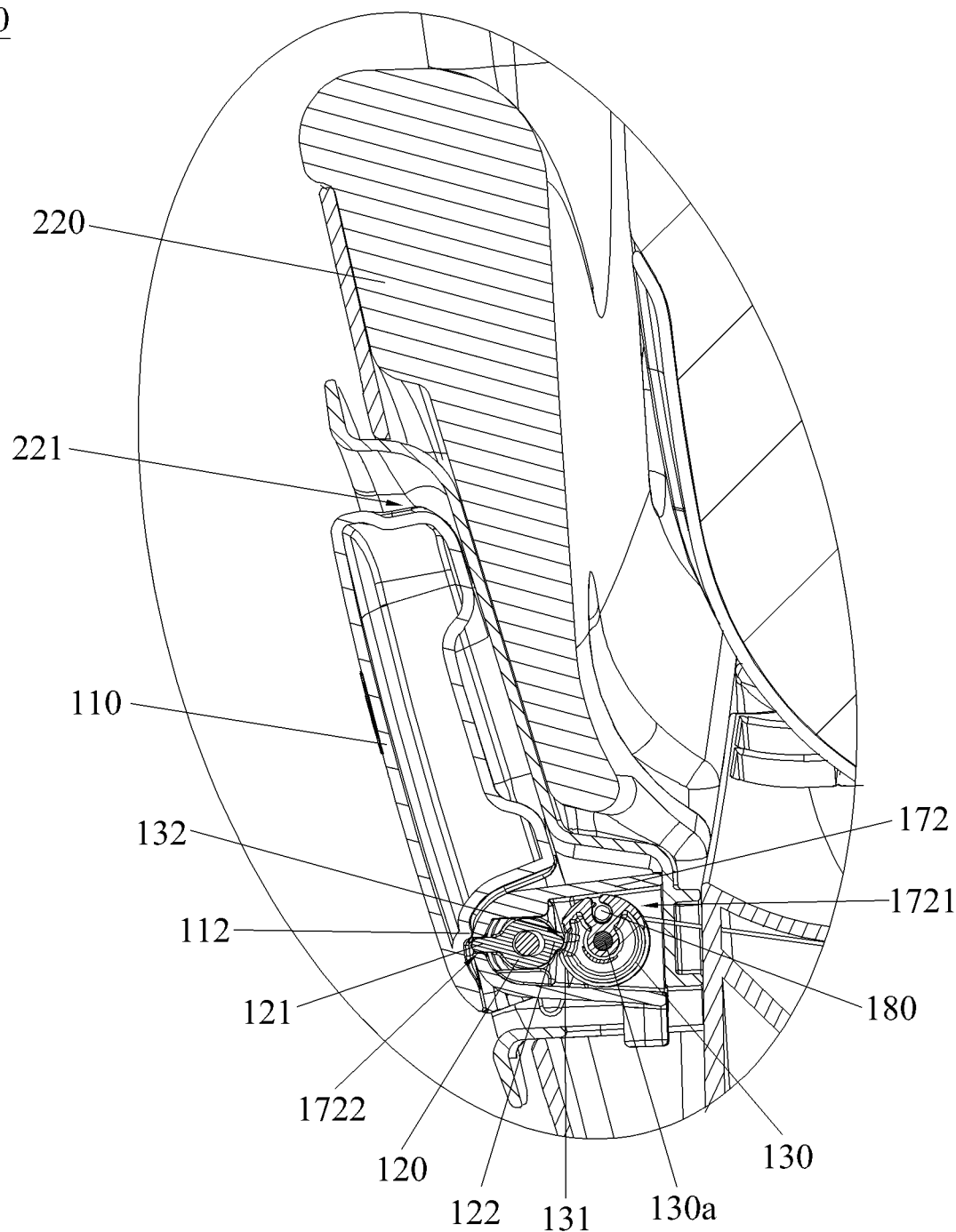
FIG. 9 is an enlarged diagram of a C portion of the child restraint system shown in FIG. 8 according to the embodiment of the present invention.

Please refer to FIG. 2 to FIG. 11. FIG. 6 is a sectional diagram of the child restraint system 1 as the lateral protecting mechanism 100 is in a state between the unfolded state and the folded state according to the embodiment of the present invention. FIG. 7 is an enlarged diagram of a B portion of the child restraint system 1 shown in FIG. 6 according to the embodiment of the present invention. FIG. 8 is a sectional diagram of the child restraint system 1 as the lateral protecting mechanism 100 is at the folded state according to the embodiment of the present invention. FIG. 9 is an enlarged diagram of a C portion of the child restraint system 1 shown in FIG. 8 according to the embodiment of the present invention. As shown in FIG. 2 to FIG. 11, the lateral protecting mechanism 100 further includes two unfolding resilient components 150 and two recovering resilient components 160. The two unfolding resilient components 150 are disposed between the protecting block 110 and the lateral portion 220 for biasing the protecting block 110 to pivotally switch to the unfolded position. Therefore, the protecting block 110 can be pivotally unfolded automatically to be maintained at the unfolded position by a resultant resilient force of the two unfolding resilient components 150. The two recovering resilient components 160 are disposed between the driving component 130 and the lateral portion 220 for biasing the driving component 130 to recover to allow the locking component 120 to slide from the locking position to the releasing position.

In this embodiment, the unfolding resilient component 150 and the recovering resilient component 160 can be torsional springs. However, the present invention is not limited thereto. For example, in another embodiment, the unfolding resilient component or the recovering resilient component also can be a leaf spring. Furthermore, the number of the unfolding resilient component 150 and the number of the recovering resilient component 160 are not limited to this embodiment. For example, in another embodiment, the lateral protecting mechanism can include one unfolding resilient component and one recovering resilient component.

As shown in FIG. 1 to FIG. 5 and FIG. 10 to FIG. 11, the lateral protecting mechanism 100 further includes a fixing base 170. The fixing base 170 is fixedly disposed on the lateral portion 220. The protecting block 110 includes a pivoting shaft 110a. The protecting block 110 is pivotally disposed on the fixing base 170 by the pivoting shaft 110a. The two unfolding resilient components 150 are disposed on the pivoting shaft 110a, and two ends of each unfolding resilient component 150 respectively abut against the protecting block 110 and the fixing base 170, so that the protecting block 110 is biased to pivotally switch to the unfolded position by the two unfolding resilient components 150. The locking component 120 is slidably disposed inside the fixing base 170 and slidable relative to the protecting block 110 back and forth, so as to separably abut against the protecting block 110. The driving component 130 includes a driving pivoting shaft 130a. The driving component 130 is pivotally disposed inside the fixing base 170 by the driving pivoting shaft 130a and coupled to the operating component 140. The driving component 130 is located at a side of the locking component 120 away from the protecting block 110. The two recovering resilient components 160 are disposed on the driving pivoting shaft 130a, and two ends of the recovering resilient component 160 respectively abut against the driving component 130 and the fixing base 170, as shown in FIG. 3, so that the driving component 130 is biased to pivotally recover to allow the locking component 120 to slide from the locking position to the releasing position. Furthermore, when the lateral protecting mechanism 100 is switched to the locking state as shown in FIG. 10 and FIG. 11, the driving component 130 drives the locking component 120 to slide to the locking position, so as to restrain the protecting block 110 at the folded position from leaving from the folded position.

As shown in FIG. 1 to FIG. 5, the fixing base 170 includes a fixing portion 171 and a mounting portion 172 protruding from the fixing portion 171. The fixing base 170 is fixedly disposed on the lateral portion 220 by the fixing portion 171. The protecting block 110 is pivotally connected to the mounting portion 172. The locking component 120 and the driving component 130 are disposed inside the mounting portion 172. The driving component 130 can drive the locking component 120 to slide to protrude out of the mounting portion 172 to abut against the protecting block 110.

As shown in FIG. 1 to FIG. 3, a first end 1101 of the protecting block 110 is configured to receive an impact force, and two pivoting lugs 111 protrude from a second end 1102 of the protecting block 110 opposite to the first end of the protecting block 110 and are spaced apart from each other. A positioning rib 112 protrudes from the second end 1102 of the protecting block 110 and located between the two pivoting lugs 111. The positioning rib 112 extends along a direction substantially parallel to a pivoting axis of the pivoting shaft 110a. The two pivoting lugs 111 pivotally engage with the mounting portion 172 by the pivoting shaft 110a and located outside of the mounting portion 172. The locking component 120 can protrude out of the mounting portion 172 to abut against the positioning rib 112.

More specifically, an accommodating chamber 1721 is formed inside the mounting portion 172. A through hole 1722 is formed on a wall of the mounting portion 172 and communicated with the accommodating chamber 1721. The locking component 120 is slidably accommodated inside the accommodating chamber 1721. A sliding direction of the locking component 120 is substantially perpendicular to a pivoting axis of the pivoting shaft 110a of the protecting block 110. The locking component 120 can slide to pass through the through hole 1722 to protrude out of the fixing base 170 to abut against the protecting block 110. The driving component 130 is accommodated inside the accommodating chamber 1721, and an outer periphery 131 of the driving component 130 abuts against the locking component 120. The driving component 130 is pivotally connected to the mounting portion 172 by the driving pivoting shaft 130a, and a pivoting axis of the driving pivoting shaft 130a is substantially parallel to the pivoting axis of the pivoting shaft 110a of the protecting block 110. Furthermore, the outer periphery 131 of the driving component 130 is coupled to the operating component 140, and therefore, the operating component 140 can drive the driving component 130 to pivot when the operating component 140 is operated. When the operating component 140 is operated to drive the driving component 130 to pivot, the two recovering resilient components 160 are resiliently deformed, so that the driving component 130 is biased to pivotally recover by the deformed two recovering resilient components 160. Furthermore, when the operating component 140 is operated to drive the driving component 130 to pivot, the locking component 120 is driven by the driving component 130 to slide to the locking position, and when the two resiliently deformed recovering resilient components 160 drive the driving component 130 to pivotally recover, the locking component 120 is allowed to slide from the locking position to the releasing position.

As shown in FIG. 4 to FIG. 11, the locking component 120 includes a positioning protrusion 121 and an abutting protrusion 122. The positioning protrusion 121 is located at a position corresponding to the positioning rib 112 and protrudes toward the protecting block 110 along the sliding direction of the locking component 120. The abutting protrusion 122 protrudes toward the driving component 130 along the sliding direction of the locking component 120, i.e., a protruding direction of the abutting protrusion 122 is opposite to a protruding direction of the positioning protrusion 121. The positioning protrusion 121 can pass through the through hole 1722 to protrude out of the fixing base 170 to abut against the protecting block 110. The abutting protrusion 122 abuts against the outer periphery 131 of the driving component 130.

Furthermore, the outer periphery 131 of the driving component 130 is formed in an arc shape, and a positioning recess 132 is formed on the outer periphery 131 of the driving component 130 and extends along a rotating direction of the driving component 130 for separably engaging with the abutting protrusion 122 of the locking component 120. Specifically, when the locking component 120 is located at the releasing position as shown in FIG. 4 and FIG. 5, the abutting protrusion 122 engages with the positioning recess 132. The driving component 130 can pivot to disengage the abutting protrusion 122 from the positioning recess 132 due to structural design of the descending positioning recess 132, so as to push the locking component 120 to slide toward the protecting block 110 to the locking position to abut against the positioning rib 112, which can restrain the protecting block 110 from leaving from the folded position when the protecting block 110 is at the folded position.

As shown in FIG. 1, FIG. 2 and FIG. 4 to FIG. 11, the operating component 140 is movably disposed on the child carrier 200. The operating component 140 can drive the driving component 130 to pivot to drive the locking component 120 to slide to the locking position when the operating component 140 is operated. Therefore, a user or a caregiver can fold at least one of the two protecting blocks 110 to the folded position according to practical demands and then operate the operating component 140 to restrain the at least folded one of the two protecting blocks 110 from leaving from the folded position.

In this embodiment, the operating component 140 can preferably be combined with a crotch strap of the harness system. Therefore, the crotch strap operates the operating component 140 to drive the driving component 130 to drive the locking component 120 to slide to the locking component when the crotch strap is fastened. However, the present invention is not limited to this embodiment. For example, in another embodiment, the operating component also can be disposed on any other component of the child carrier, so that the operating component can be forced by a child sitting in the seat portion to drive the driving component to drive the locking component to the locking position when the child sits in the seat portion.

Furthermore, in this embodiment, since the operating component 140 is away from the driving component 130, the lateral protecting mechanism 100 further includes a linking component 180. Two ends of the linking component 180 are respectively connected to the outer periphery 131 of the driving component 130 and the operating component 140. Therefore, the operating component 140 can drive the driving component 130 to pivot by the linking component 180 when the operating component 140 is operated. Preferably, the linking component can be a cable. However, the present invention is not limited thereto. For example, in another embodiment, the linking component can be a flexible or resilient cable. Alternatively, in another embodiment, the operating component can be connected to the driving component directly, and the linking component can be omitted.

Detailed description of operation of the lateral protecting mechanism 100 is provided as follows. As shown in FIG. 4 and FIG. 5, no matter whether there is a child sitting in the seat portion 210 or not, the protecting block 110 is driven to pivot to the unfolded position by the two unfolding resilient components 150 as long as the operating component 140 is not operated. Furthermore, at this moment, the locking component 120 is located at the releasing position, and the positioning recess 132 engages with the abutting protrusion.

After a child sits in the seat portion 210, the protecting block 110 can be operated to maintain at the unfolded position or to fold to the folded position according to practical demands.

When it is desired to fold the protecting block 110, the protecting block 110 can be operated to pivot around the pivoting shaft 110a to be accommodated inside the accommodating slot 211, i.e., the protecting block 110 can be driven to pivot from the unfolded position as shown in FIG. 4 and FIG. 5, to the folded position as shown in FIG. 8 and FIG. 9, by the folding force. When the protecting block 110 is located at the folded position, the protecting block 110 fits with the lateral portion 220. During the aforementioned process, the two unfolding resilient components 150 are resiliently deformed.

Afterwards, the crotch strap of the harness system can be fastened to operate the operating component 140 to drive the driving component 130 to pivot by the linking component 180 to disengage the abutting protrusion 122 from the positioning recess 132, so that the locking component 120 is driven to slide from the releasing position as shown in FIG. 8 and FIG. 9, to the locking position as shown in FIG. 10 and FIG. 11. When the locking component 120 is located at the locking position, the positioning protrusion 121 passes through the through hole 1722 to protrude out of the fixing base 170 to abut against the positioning rib 112 of the protecting block 110, so as to restrain the protecting block 110 from leaving from the folded position. It should be noticed that as long as the crotch strap is fastened, the locking component 120 can be maintained at the locking position for preventing the protecting block 110 from unfolding. For example, when the child restraint system 1 is installed on a vehicle, the protecting block 110 which is away from a door of the vehicle can be folded to the folded position and restrained from leaving from the folded position for saving occupied space.

When the crotch strap is released, the operating component 140 is not operated any more. At this moment, the two recovering components 160 can drive the driving component 130 to pivotally recover to align the positioning recess 132 with the abutting protrusion 122, so that the locking component 120 is not abutted by the outer periphery 131 of the driving component 130 for allowing the locking component 120 to slide from the locking position to the releasing position. Afterwards, the protecting block 110 can be driven to be unfolded to the unfolded position by the two unfolding resilient components 150, and the locking component 120 can be driven to slide to the releasing position by the protecting block 110 during unfolding of the protecting block 110.

On the other hand, when the crotch strap is fastened to operate the operating component 140 to drive the driving component 130 to pivot by the linking component 180 in a condition that the protecting block 110 is located at the unfolded position, since the positioning protrusion 121 which passes through the through hole 1722 to protrude out of the fixing base 170 does not abut against the positioning rib 112 of the protecting block 110, i.e., the locking component 120 at the locking position does not interfere with the protecting block 110 at the unfolded position, so that the protecting block 110 can be maintained at the unfolded position. Therefore, it allows a user or a caregiver to operate one of the two protecting blocks 110 to be at the unfolded position and operate the other one of the two protecting blocks 110 to be at the folded position easily.

In contrast to the prior art, in the present invention, as long as the protecting block is not forced to fold by a folding force or not restrained from leaving from the folded position by the locking component, the protecting block can be driven to pivotally switch to the unfolded position automatically by the unfolding resilient component, so as to reduce a lateral impact force when an emergency brake or an accident of a vehicle occurs. It not only simplifies operation but also prevents a user or a caregiver from forgetting to unfold the protecting block to ensure the lateral protecting mechanism to work properly. Furthermore, when the operating component is operated, the operating component drives the driving component to drive the locking component to slide to the locking position for restraining the protecting block at the folded position from leaving from the folded position. Therefore, it provides a convenient way to save occupied space by folding the protecting block to the folded position and then operating the operating component to restrain the protecting block from leaving from the folded position according to practical demands. Besides, when the locking component slides from the releasing position to the locking position, the locking component does not interfere with the protecting block at the unfolded position, and therefore, the protecting block can be maintained at the unfolded position, which brings convenience in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lateral protecting mechanism adapted for a child carrier, the lateral protecting mechanism comprising:
   a protecting block pivotally disposed a lateral portion of the child carrier;
   a locking component slidably disposed on the lateral portion of the child carrier and configured to slide to abut against the protecting block for restraining a pivoting movement of the protecting block;
   a driving component located at a position corresponding to the locking component for driving the locking component to slide to abut against the protecting block for restraining the pivoting movement of the protecting block; and
   an operating component coupled to the driving component for driving the driving component to pivot to drive the locking component to abut against the protecting block when the operating component is operated.

2. The lateral protecting mechanism of claim 1, wherein the operating component is disposed on a seat portion of the child carrier.

3. The lateral protecting mechanism of claim 2, wherein the operating component is combined with a strap disposed on the seat portion of the child carrier, and the strap operates the operating component to drive the driving component to drive the locking component to slide to abut against the protecting block for restraining the pivoting movement of the protecting block when the strap is fastened.

4. The lateral protecting mechanism of claim 1, further comprising a linking component connected to the driving component and the operating component, and the operating component driving the driving component to drive the locking component to slide for restraining the pivoting movement of the protecting block by the linking component when the operating component is operated.

5. The lateral protecting mechanism of claim 1, further comprising at least one unfolding resilient component disposed between the protecting block and the lateral portion of the child carrier for driving the protecting block to pivot.

6. The lateral protecting mechanism of claim 1, wherein a positioning recess is on an outer periphery of the driving component and extends along a rotating direction of the driving component for separably engaging with the locking component.

7. The lateral protecting mechanism of claim 6, wherein the locking component does not abut against the protecting block when the locking component engages with the positioning recess, and the locking component is driven to slide to abut against the protecting block when the driving component pivots to disengage the locking component from the positioning recess.

8. The lateral protecting mechanism of claim 6, wherein the locking component comprises an abutting protrusion located at a position corresponding to the positioning recess for separably engaging with the positioning recess.

9. The lateral protecting mechanism of claim 6, wherein the operating component is connected to the outer periphery of the driving component to drive the driving component to pivot.

10. The lateral protecting mechanism of claim 1, wherein the locking component comprises a positioning protrusion protruding along a sliding direction of the locking component, and the protecting block comprises a positioning rib located at a position corresponding to the positioning protrusion.

11. The lateral protecting mechanism of claim 10, wherein the protecting block is restrained from pivoting when the positioning protrusion engages with the positioning rib.

12. The lateral protecting mechanism of claim 1, further comprising at least one recovering resilient component disposed between the driving component and the lateral portion of the child carrier for driving the driving component to recover.

13. The lateral protecting mechanism of claim 1, further comprising a fixing base fixedly disposed on the lateral portion of the child carrier, the protecting block comprising a pivoting shaft, the protecting block being pivotally disposed on the fixing base by the pivoting shaft, the locking component being configured to protrude out of the fixing base to abut against the protecting block, and the driving component being disposed inside the fixing base.

14. The lateral protecting mechanism of claim 13, wherein the fixing base comprises a fixing portion and a mounting portion protruding from the fixing portion, the fixing base is fixedly disposed on the lateral portion of the child carrier by the fixing portion, the locking component is slidably disposed inside the mounting portion, the driving component is pivotally disposed inside the mounting portion and abuts against the locking component, and the protecting block is pivotally disposed on the mounting portion and located outside the mounting portion.

15. The lateral protecting mechanism of claim 14, wherein an accommodating chamber is in the mounting portion, a through hole is on a wall of the mounting portion and communicated with the accommodating chamber, the locking component and the driving component are disposed in the accommodating chamber, and the locking component slides to pass through the through hole to abut against protecting block.

16. The lateral protecting mechanism of claim 14, wherein a sliding direction of the locking component intersects with a pivoting axis of the protecting block.

17. A child restraint system comprising:
a child carrier comprising a seat portion and at least one lateral portion; and
at least one lateral protecting mechanism comprising:
  a protecting block pivotally disposed on the at least one lateral portion of the child carrier;
  a locking component slidably disposed on the at least one lateral portion of the child carrier and configured to slide to abut against the protecting block for restraining a pivoting movement of the protecting block;
  a driving component located at a position corresponding to the locking component for driving the locking component to slide to abut against the protecting block for restraining the pivoting movement of the protecting block; and
  an operating component coupled to the driving component for driving the driving component to pivot to drive the locking component to abut against the protecting block when the operating component is operated.

18. The child restraint system of claim 17, wherein the operating component is connected to a strap disposed on the seat portion of the child carrier, and the strap operates the operating component to drive the driving component to drive the locking component to slide to abut against the protecting block for restraining the pivoting movement of the protecting block when the strap is fastened.

19. The child restraint system of claim 17, wherein the at least one lateral protecting mechanism further comprises a fixing base fixedly disposed on the at least one lateral portion of the child carrier, the protecting block comprises a pivoting shaft, the protecting block is pivotally disposed on the fixing base by the pivoting shaft, the locking component is configured to protrude out of the fixing base to abut against the protecting block, and the driving component is disposed inside the fixing base.

20. The child restraint system of claim 19, wherein the fixing base comprises a fixing portion and a mounting portion protruding from the fixing portion, the fixing base is fixedly disposed on the at least one lateral portion of the child carrier by the fixing portion, the driving component is pivotally disposed inside the mounting portion, a positioning recess is on an outer periphery of the driving component and extends along a rotating direction of the driving component, the locking component comprises an abutting protrusion located at a position corresponding to the positioning recess for separably engaging with the positioning recess, the locking component does not abut against the protecting block when the locking component engages with the positioning recess, and the locking component is driven to slide to abut against the protecting block when the driving component pivots to disengage the locking component from the positioning recess.

21. The child restraint system of claim 17, wherein the locking component comprises a positioning protrusion protruding along a sliding direction of the locking component, the protecting block comprises a positioning rib located at a position corresponding to the positioning protrusion, and the protecting block is restrained from pivoting when the positioning protrusion engages with the positioning rib.

22. The child restraint system of claim 17, wherein a sliding direction of the locking component intersects with a pivoting axis of the protecting block.

* * * * *